United States Patent
Mirescu et al.

(10) Patent No.: US 7,129,610 B2
(45) Date of Patent: Oct. 31, 2006

(54) COMMUTATOR FOR AN ELECTRIC MOTOR

(75) Inventors: Dan Mirescu, Caen (FR); Philippe Raoul, Fresne la Mere (FR)

(73) Assignee: ArvinMeritor Light Vehicle Systems-France, Sully-sur-Loire (FR)

( * ) Notice: Subject to any disclaimer, the term of this patent is extended or adjusted under 35 U.S.C. 154(b) by 0 days.

(21) Appl. No.: 11/105,320

(22) Filed: Apr. 13, 2005

(65) Prior Publication Data

US 2005/0242682 A1 Nov. 3, 2005

(30) Foreign Application Priority Data

Apr. 28, 2004 (FR) .................................. 04 04506

(51) Int. Cl.
*H02K 13/04* (2006.01)
(52) U.S. Cl. ........................ 310/136; 310/233
(58) Field of Classification Search ............. 310/68 B, 310/136, 233, 235–237, 231
See application file for complete search history.

(56) References Cited

U.S. PATENT DOCUMENTS

| 479,793 | A | * | 8/1892 | Elkins ......................... 310/220 |
| 2,831,154 | A | * | 4/1958 | Dudenhausen ............... 318/807 |
| 3,774,094 | A | * | 11/1973 | Peterson ....................... 388/822 |
| 3,832,608 | A | * | 8/1974 | Mills .............................. 318/37 |
| 3,876,919 | A | * | 4/1975 | Kearns ......................... 388/819 |
| 3,940,644 | A | * | 2/1976 | Manz ........................... 310/148 |
| 4,025,808 | A |   | 5/1977 | Grengg et al. |
| 5,633,792 | A | * | 5/1997 | Massey ........................ 363/109 |
| 6,107,712 | A | * | 8/2000 | Yamamura et al. ........ 310/68 B |
| 6,791,218 | B1 | * | 9/2004 | Dragoi et al. .............. 310/68 B |
| 6,803,685 | B1 | * | 10/2004 | Ikawa et al. ............... 310/68 B |

FOREIGN PATENT DOCUMENTS

| EP | 0 359 855 | 3/1990 |
| FR | 2 715 519 | 7/1995 |
| FR | 2 814 868 | 10/2000 |
| WO | WO 98/35427 | 8/1998 |

OTHER PUBLICATIONS

French Search Report dated Nov. 26, 2004.

* cited by examiner

*Primary Examiner*—Dang Le
(74) *Attorney, Agent, or Firm*—Carlson, Gaskey & Olds

(57) ABSTRACT

A commutator includes a support ring and a plurality of conducting segments arranged over a circumference of the support ring. Some of the conducting segments have an electrically insulating portion. The commutator is employed with a device that measures rotation of an electric motor rotor shaft. The commutator is fitted onto the electric motor rotor shaft. A commutator housing includes at least three brushes and comes into contact with the conducting segments of the commutator. At least one of the brushes contacts the electrically insulating portions of the commutator segments to provide an electrical measurement that enables the speed, the direction of rotation and the angular position of the electric motor rotor shaft to be determined.

14 Claims, 4 Drawing Sheets

COMMUTATOR FOR AN ELECTRIC MOTOR

REFERENCE TO RELATED APPLICATION

This application claims priority to French Patent Application FR 04 04 506 filed on Apr. 28, 2004.

BACKGROUND OF THE INVENTION

This invention relates generally to a commutator for an electric motor and to a device for measuring the rotation of an electric motor rotor shaft of the commutator. In particular, the invention applies to an electric motor designed to drive motor vehicle equipment, such as a window regulator, a sunroof or a seat operation motor, for example.

French Patent No. 2,814,868 discloses an electric motor including a commutator.

A conventional commutator 10 is illustrated in FIG. 1. The commutator 10 includes a support ring 11 having a tubular shape made of an insulating material, such as plastic. The support ring 11 is surrounded by a plurality of metal commutator segments 18 arranged over the entire periphery of the support ring 11. The support ring 11 can include notches which receive the metal commutator segments 18. The notches can define a rib 14 between each pair of adjacent metal commutator segments 18. The metal commutator segments 18 are consequently perfectly insulated from each other by the central support ring 11 and the ribs 14. The support ring 11 can, for example, be directly molded in plastic with an appropriate shape or can be tooled. The metal commutator segments 18 also include hook members 13 formed at one end of each metal commutator segment 18. The hook members 13 allow subsequent connection of the commutator segments 18 to the rotor windings.

An electric motor generally includes a stator frame and a rotor mounted rotatably in the stator. The motor also includes windings integral with the rotor shaft, and each winding is electrically connected to two diametrically opposed segments of the commutator 10 by the hook members 13.

The commutator 10 is generally mounted in a commutator housing integral with the stator. The housing includes a support having a central opening designed to receive the commutator 10 and to allow the rotor shaft to pass through the housing support. The housing support is made of an insulating material, for example plastic.

The commutator housing also includes at least one pair of brushes diametrically opposed relative to the commutator 10 to make contact with the segments of the commutator 10 during the rotation that is linked to the rotor shaft. The brushes are electrically connected to a supply of electric current and supply the stator windings with current.

Additionally, in an electric motor, it is necessary to control the rotor shaft speed and to know, at any time, the speed of rotation, the direction of rotation and the angular position of the rotor shaft. This information is particularly necessary for the electronics generally associated with a window regulator motor that performs applications associated with the window regulator, such as an anti-trapping function, a resume raising function, a slowdown-at-end-of-travel function, or the like.

A Hall effect sensor is used to determine the speed of rotation of the motor rotor shaft. A magnetic ring is arranged on the rotor shaft and provides a rotating magnetic field integral with the rotor shaft rotation. The Hall effect sensor is generally arranged near the magnetic ring to determine the rotor shaft speed of rotation from the frequency of alternation of the magnetic field. The Hall effect sensor can also be arranged far from the magnetic ring, for example, on a printed circuit board of the electronics associated with the electric motor. Flux guiding members then lead the magnetic flux from the rotor shaft ring to the Hall Effect sensor. This solution is disclosed in EP 0,891,647.

To determine the direction of rotation of the rotor shaft or the angular position, two Hall effect sensors are used to measure the magnetic flux at separate points of the magnetic ring arranged on the rotor shaft. Although Hall effect sensors provide reliable measurements, they are expensive and complicate motor design.

Apart from the cost of the sensor or sensors, it is also necessary to mount a magnetic ring on the rotor shaft and to optionally provide flux guiding members, which is also a burden on motor production.

It is also necessary to ensure that the magnetic flux employed for measuring the rotor shaft rotation does not interfere with operation of the motor and that the electric components of the motor (commutator brushes, stator windings or otherwise) do not interfere with the magnetic measurements.

There is consequently a need for a device for measuring the rotation of an electric motor shaft which is simplified and yet reliable.

SUMMARY OF THE INVENTION

The present invention does not employ Hall effect sensors and instead uses a commutator of a rotor to measure rotor shaft rotation. The invention provides a commutator for an electric motor including a support ring and a plurality of conducting segments arranged over a circumference of the support ring. Some of the plurality of conducting segments have an electrically insulating portion.

According to one embodiment, the conducting segments that have an electrically insulating portion are distributed over the support ring in correspondence to a pre-defined coding. At least one conducting segment out of every two may have an electrically insulating portion.

In one embodiment, each conducting segment has a conducting hook member located at one end of the conducting segment, and the electrically insulating portion is located at an opposing end of each conducting segment.

In all embodiments, the electrically insulating portion can be provided by the support ring, can be provided by an insulating material that partially covers the conducting segments, and can be delimited by appropriately tooling the conducting segment to interrupt electrical conduction. Preferably, the electrically insulating portion extends over a length that is between 25% and 55% of the entire length of the conducting segment.

A device that measures rotation of an electric motor rotor shaft includes a commutator as described above, and a support ring of the commutator is fitted over the electric motor rotor shaft of a rotor. A commutator housing includes at least three brushes to come into contact with the conducting segments of the commutator. At least one of the brushes is arranged to come into contact with the electrically insulating portions.

The brush that contacts the electrically insulating portions of the conducting segments can be arranged parallel to an electrical supply brush. The brush that contacts the electrically insulating portions and the electrical supply brush simultaneously contact the same conducting segment of the commutator.

The device can further include an electrical measurement circuit connected to the brush that contacts the electrically insulating portions. Preferably, the electrical measurement circuit includes a voltage divider bridge that measures the voltage at the terminals of the brush that contacts the electrically insulating portions. Preferably, the electrical measurement circuit measures current passing in the brush that contacts the electrically insulating portions.

The device can further include a processing circuit for processing the electrical measurements delivered by the electrical measuring circuit for the brush that contacts the electrically insulating portions. The processing circuit determines at least one of the speed, the direction of rotation and the angular position of the electric motor rotor shaft from the electrical measurement.

The present invention also provides a method for measuring the rotation of an electric motor rotor shaft including the steps of measuring an electrical value representing a position of a brush in contact with electrically insulating portions on a commutator and determining at least one of the speed, the direction of rotation and the angular position of the electric motor rotor shaft from the electrical measurement.

Further characteristics and advantages of the invention will become more clear from the description which follows of some embodiments thereof, provided solely by way of example and with reference to the attached drawings.

BRIEF DESCRIPTION OF THE DRAWINGS

FIG. 7b shows an interpretation of FIG. 7a.

DETAILED DESCRIPTION OF THE PREFERRED EMBODIMENT

Figure 1:
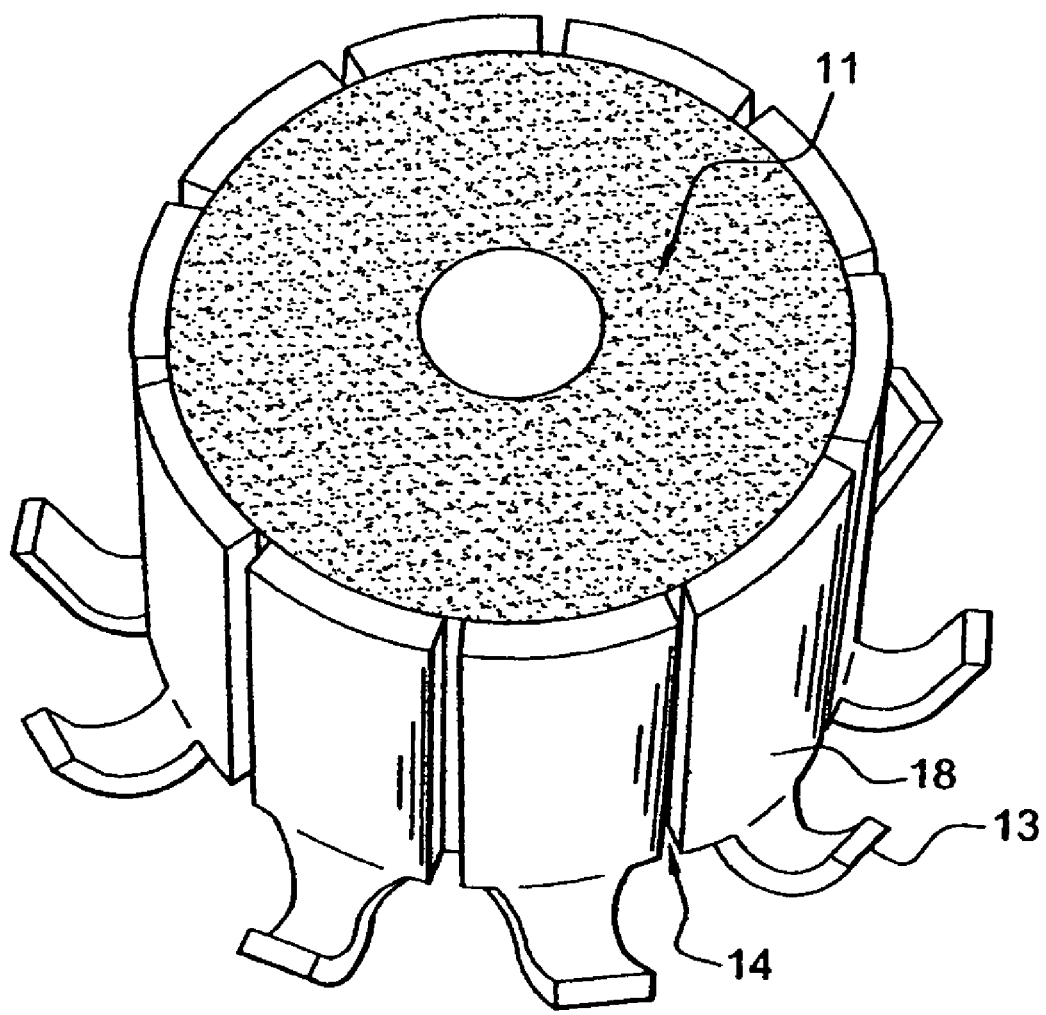
FIG. 1, already described, is a diagrammatic view of a commutator of the prior art.

The commutator according to the invention includes a support ring and a plurality of conducting segments arranged on a periphery of the support ring. Some of the conducting segments include an electrically isolating portion.

Thus, according to the invention, the commutator is employed in a device for measuring the rotation of a rotor shaft of an electric motor. The commutator ring is slipped over the rotor shaft and arranged inside a commutator housing. The housing includes at least three brushes that contact the commutator segments. At least one of the brushes is arranged to contact with the electrically insulating portions. The brush, which alternately contacts the conducting portions and the electrically insulating portions of the commutator segments, supplies an electrical measurement allowing the speed and the direction of rotation of the rotor shaft to be determined.

The commutator according to the invention will now be described in more detail with reference to the drawings in FIGS. 2 and 3. The commutator 10 includes, as known per se, an insulating support ring 11 and conducting segments 18 arranged around a circumference of the support ring 11. Depending on the model, the commutator 10 can have a varying number of conducting segments 18 depending on the application and specific motor design. In the example illustrated of a commutator 10 for an electric motor for regulating a window glass or other openable component of a vehicle, the commutator 10 has ten segments.

Each conducting segment 18 of the commutator 10 includes a hook member 13, known per se, for making a soldered connection between the conducting segments 18 and the stator windings (not shown). According to the invention, some of the conducting segments 18 include an electrically insulating portion 19, that is, a portion that is electrically insulated from the current conduction parts necessary for rotation of the motor.

At least two of the conducting segments 18 have an electrically insulating portion 19 and at least two of the conducting segments 18 do not have electrically insulating portions. In effect, the purpose of the electrically insulating portions 19 is to replace the magnetic ring conventionally used in a Hall effect sensor for determining the rotational speed of a motor rotor shaft. It is necessary for two separate points on the commutator support ring 11 to be identifiable during rotation to output a signal that can be interpreted when the rotor shaft is rotating. The operation of the rotor shaft rotation measuring device will be described in more detail below.

Depending on the embodiment, the conducting segments 18 which have the electrically insulating portion 19 can be distributed alternately on every second conducting segment 18, can be distributed alternating with completely conducting segments 18 (as illustrated on FIG. 2), or can be distributed with some other periodicity corresponding to a pre-defined coding. Thus, one can provide two consecutive partially insulating portions 19 followed by three fully conducting segments 18. Further, a non-periodic coding can be provided, as illustrated in FIG. 3. Any other periodic or non-periodic distribution can clearly be envisioned, depending on the desired embodiments and applications.

Figure 2:
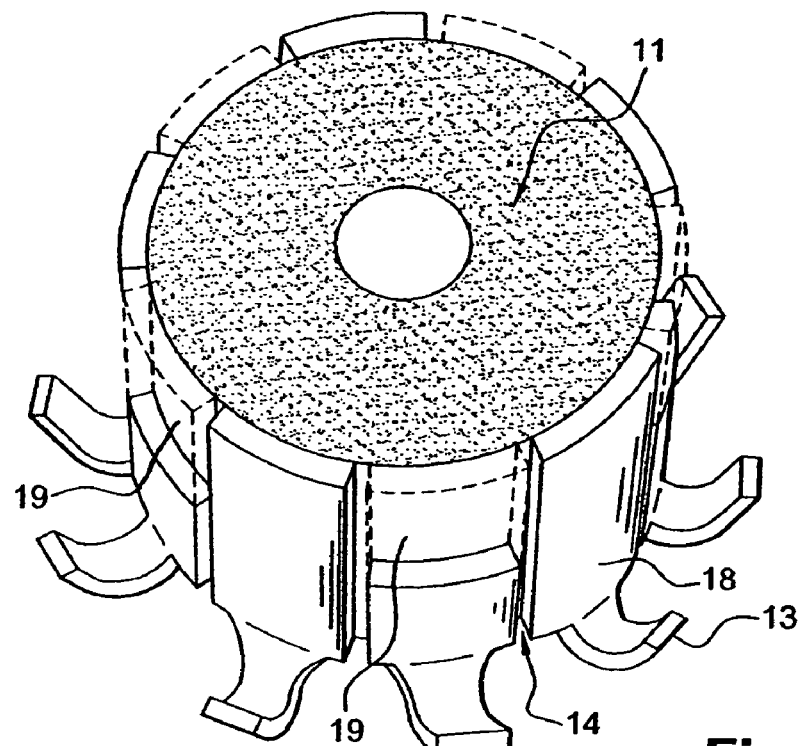
FIG. 2 diagrammatically shows a commutator according to a first embodiment of the invention.

According to the embodiment illustrated in FIG. 2, the electrically insulating portion 19 of certain conducting segments 18 is provided by the support ring 11 of the commutator 10. Thus, some conducting segments 18 (alternate segments in the embodiment illustrated) are shorter than others. Each conducting segment 18 is conventionally arranged in a rib 14 of the support ring 11 and completely insulated from adjacent conducting segments 18, and the rib 14 can be tooled to extend right up to the shortened conducting segments 18 and thereby prolong the conducting segment 18 by an electrically insulating portion 19.

Figure 3:
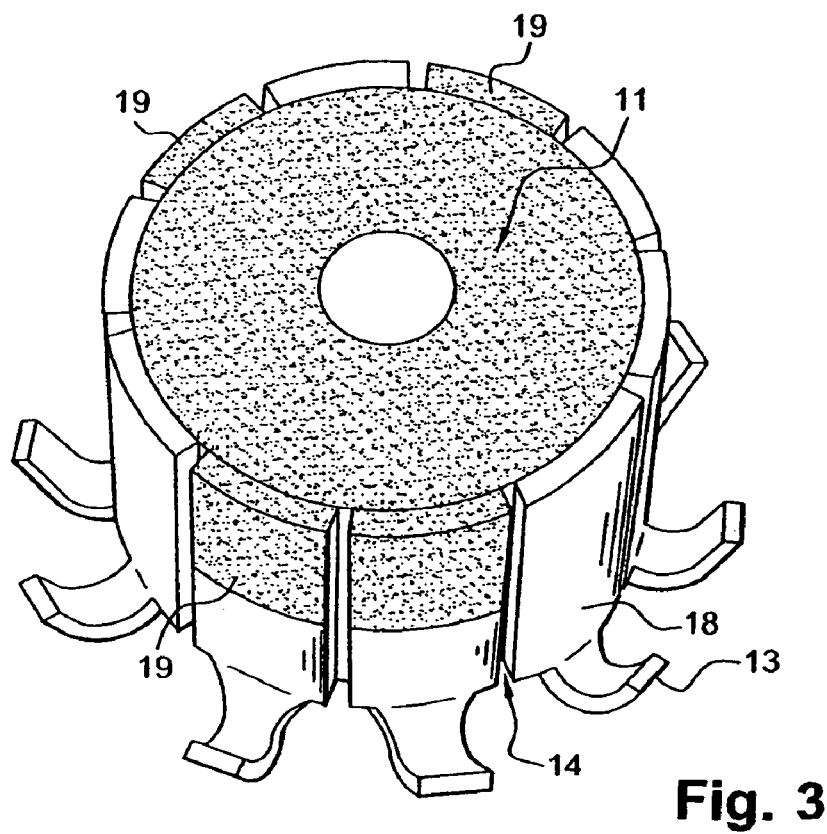
FIG. 3 diagrammatically shows the commutator according to a second embodiment of the invention.

According to the embodiment illustrated in FIG. 3, the electrically insulating portion 19 of certain conducting segments 18 is provided by an insulating material that covers a portion of the conducting segments 18. For example, this material can be an insulating varnish, such as an epoxy resin applied to a portion of certain conducting segments 18, depth oxidation, or any other surface treatment of a portion of a conducting segment 18 able to render this portion electrically insulating.

According to another embodiment, not illustrated, the electrically insulating portion 19 of certain conducting segments 18 can be obtained by tooling the conducting segment 18 to introduce a break in electrical conduction. For example, a conducting segment 18 is milled over its complete width to define an electrically insulating portion 19 in contact with the current supply brushes.

The electrically insulating portions 19 can be located at an end of a conducting segment 18 that is opposite to an end with the hook member 13. In effect, the hook members 13 constitute electrical contacts to the stator windings, which need to be supplied electrically for the motor to run. Each conducting segment 18 must consequently include at least an electrically conducting portion that corresponds to a region of contact of the brushes that supply current to the stator windings.

The electrically insulating portions 19 can extend over a smaller or greater extent of the length of the conducting segment 18. The surface area of the electrically insulating portion 19 needs to be sufficiently large to supply a quantifiable electrical measurement and sufficiently small to not interfere with the electrical supply of the stator windings performed by the conducting part of the conducting segment 18. For example, an electrically insulating portion 19 having a length between 25% and 55% of the total length of the conducting segment 18 satisfies these conditions.

Figure 4:
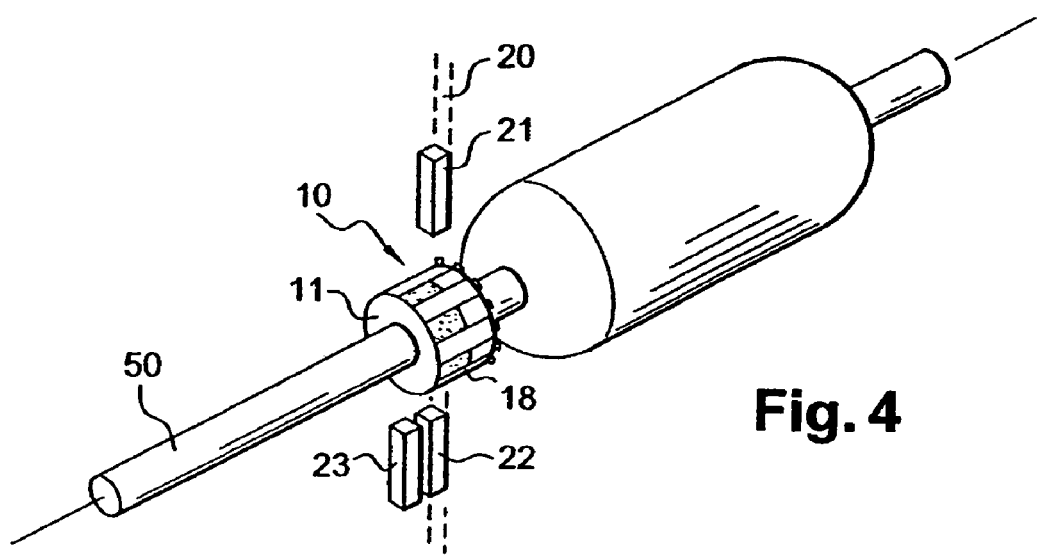
FIG. 4 diagrammatically shows a device for measuring the rotation of a motor shaft according to the invention.

The commutator 10 of the invention can be used in a device for measuring the rotation of a rotor shaft. Such a device will now be described in detail with reference to FIG. 4. Such a measuring device includes a commutator 10 as described above, and a support ring 11 of the commutator 10 is fitted over a rotor shaft 50 as is known. The device also includes a commutator housing 20 having a passage for receiving the rotor shaft 50 and the commutator 10. The commutator housing 20 carries at least three brushes 21, 22 and 23 to come into contact with the conducting segments 18 of the commutator 10.

According to the invention, at least two of the supply brushes 21 and 22 electrically supply the stator windings as known per se, and at least one additional brush 23 contacts the electrically insulating portions 19 of the conducting segments of the commutator 10.

The supply brushes 21 and 22 are consequently arranged to always be in contact with the conducting portions of the conducting segments 18, in other words, at the end of the conducting segments 18 carrying the hook members 13 for connecting the windings. The additional brush 23 is arranged parallel to one of the supply brushes 21 or 22. Thus, the additional brush 23 and one of the supply brushes 21 and 22 supplying the windings are simultaneously in contact with the same conducting segment 18 of the commutator 10.

The device for measuring the rotation of the rotor shaft according to the invention further includes an electrical measurement circuit connected to the additional brush 23 that is in contact with the electrically insulating portions 19. The electrical circuit can be arranged on a printed circuit board which can further include electrical connections to the electrical supply brushes 21 and 22.

Depending on the embodiment, the electrical measurement circuit can measure the voltage of the additional brush 23 in contact with the electrically insulating portions 19 or the current passing through the additional brush 23.

Figure 5:
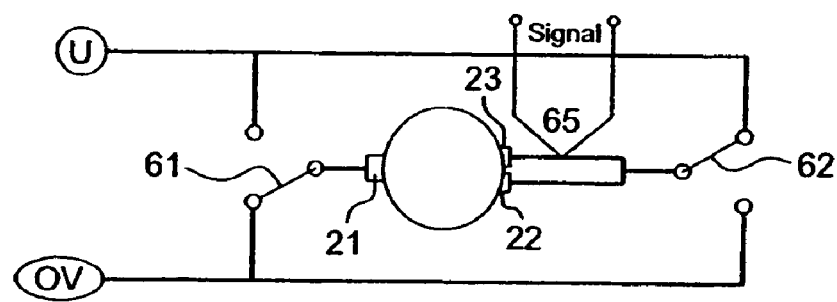
FIG. 5 is an electric circuit diagram of a first embodiment of the invention for measuring rotor shaft rotation.

The circuit illustrated in FIG. 5 measures the current passing through the additional brush 23 in contact with the electrically insulating portions 19. The motor is powered by the supply brushes 21 and 22. Switches 61 and 62, respectively, connect one of the supply brushes 21 and 22 to ground and the other of the supply brushes 21 and 22 to the supply voltage U (generally 12 volts, but motors operating at 8 volts or 42 volts may also be concerned by the invention).

A current sensor 65 detects current passing through the additional brush 23 in contact with the electrically insulating portions 19. If the additional brush 23 is on a partially insulating portion 19, no current passes through it. If the additional brush 23 is on a fully conducting segment 18, a current passes through it corresponding to a part of the supply current. Thus, an electrical signal can be collected by this measurement circuit via the current sensor 65 and transmitted to a processing circuit arranged, for example, on the printed circuit board.

The processing circuit interprets the presence and sign of the electrical current passing through the additional brush 23 to deduce the rotational speed, the direction of rotation and the angular rotor shaft position.

Figure 6:
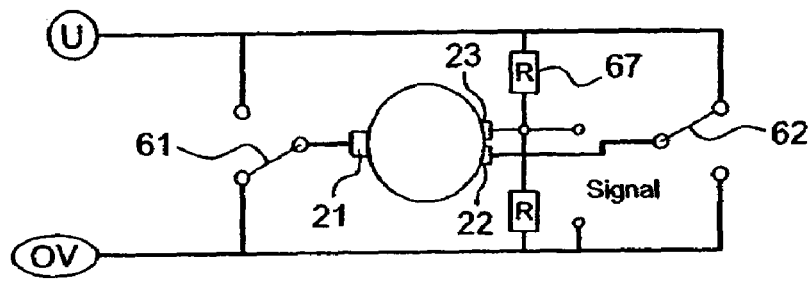
FIG. 6 is an electric circuit diagram of a second embodiment of the invention for measuring rotor shaft rotation.

The circuit illustrated in FIG. 6 measures the voltage of the additional brush 23 in contact with the electrically insulating portions 19. The motor is supplied by the supply brushes 21 and 22. The switches 61 and 62, respectively, connect one of the supply brushes 21 and 22 to ground and the other of the supply brushes 21 and 22 to the supply voltage U. A voltage divider bridge 67 is provided by two resistors, respectively, connected between ground and the additional brush 23 and between the supply voltage U for the motor and the additional brush 23.

Thus, when the additional brush 23 is on a fully conducting segment 18, the voltage measured is the same as that of the supply brush 22, in other words, a voltage of U or 0 volts depending on the direction of rotation of the motor. When the additional brush 23 is on a partially insulating portion 19, the voltage measured corresponds to the voltage of the voltage divider bridge, for example U/2 if the resistors of the voltage divider bridge are of the same value.

Thus, an electrical signal can be collected by this measurement circuit which corresponds to the voltage of the additional brush 23. The electrical signal alternates between 0 volts, U volts and an intermediate value, for example U/2. The electrical signal is transmitted to a processing circuit to deduce the speed of rotation, the direction of rotation and the angular position of the rotor shaft.

Figure 7A:
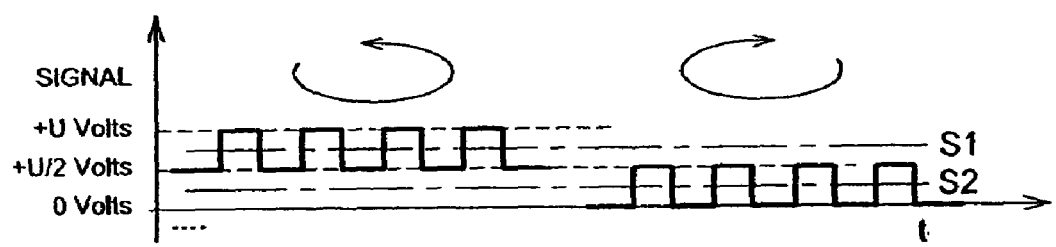
FIG. 7a is a diagram illustrating measurement of rotor shaft rotation according to the invention.
Figure 7B:
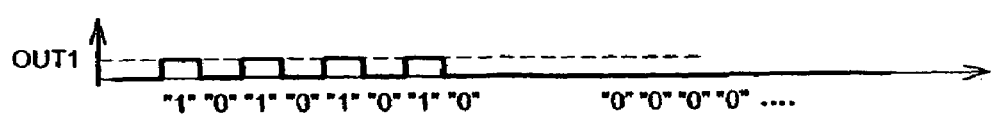

The device for measuring the rotor shaft rotation according to the invention operates as follows. The diagram in FIG. 7b illustrates operation of the device using an electrical measurement circuit corresponding to the embodiment of FIG. 6.

When the motor is not running, the supply brushes 21 and 22 are short-circuited. During operation, one of the supply brushes 21 or 22 is grounded while the other of the supply brushes 21 or 22 is at the voltage U. The direction of rotation of the motor is changed by swapping the electrical connection of the supply brushes 21 and 22 between ground and the supply voltage U.

While the motor is running, the rotor shaft 50 rotates. The commutator 10 is consequently also rotating, and the additional brush 23 is consequently successively in contact with each of the conducting segments 18 of the commutator 10.

Figure 7B:
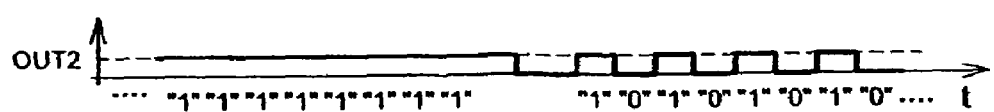

The signal transmitted by the measurement circuit connected to the additional brush 23 corresponds to the voltage of the voltage divider bridge. As illustrated in FIGS. 7 and 8, when the motor is rotating in a first direction, the voltage alternates between U (the motor supply voltage) and an intermediate value (U/2 in the example illustrated). When the motor rotates in the opposite direction, the voltage alternates between U/2 and 0 volts.

To facilitate electronic processing, threshold values can be set. When the voltage transmitted by the measurement circuit exceeds a first threshold S1, a first binary output OUT 1 of the processing circuit is high. When the voltage transmitted by the measurement circuit exceeds a second threshold S2, a second binary output OUT 2 of the processing circuit is high. These results are indicated in the diagram of FIG. 7b.

The processing circuit can consequently readily deduce the direction of rotation of the motor from the voltage values transmitted by the measurement circuit. When the first output OUT 1 is delivering a series of "1s" and "0s" while the second output OUT 2 remains high (at "1"), the motor is rotating in a first direction. Similarly, when the first output OUT 1 is low while the second output OUT 2 is supplying alternate "1s" and "0s", the motor is rotating in a second direction.

The processing circuit can also deduce the speed of rotation by calculating the period of the electrical signal output. In effect, each alternation of the value "0" or "1" of either binary output corresponds to the additional brush 23 passing from a fully conducting segment 18 to a partially insulating segment. Depending on the coding chosen for distributing the partially insulating segments, the processing circuit deduces the speed of rotation of the rotor shaft 50 from the period of the electrical signal pulses measured.

Further, the angular position of the rotor shaft 50 is determined by counting the number of pulses, with a modulo corresponding to the number of conducting segments 18 on the commutator 10 or to the number of alternations of fully or partially conducting segments.

The present invention consequently makes it possible to determine, reliably and efficiently, the speed, the direction of rotation and the angular position of the rotor shaft 50. The commutator 10 is an essential component of the motor. The invention consequently makes it possible to not employ the magnetic ring and/or Hall effect sensors without significant cost in exchange.

Further, the speed and the angular position of the rotor shaft are supplied with increased accuracy since the commutator 10 has, on average, some ten conducting segments 18 compared to the two poles of a magnetic ring.

Obviously, this invention is not limited to the embodiments described by way of example. Thus, the device for measuring rotation of a rotor shaft has been illustrated with two electrical supply brushes and a third brush for measuring rotor rotation, but this can be readily modified in the framework of the invention for use in motors requiring three, four or more supply brushes and two brushes for contact with insulating portions.

Similarly, the electronic measurement and processing circuits can be adapted in other embodiments. In particular, as a function of the type of motor and use, by employing a printed circuit board with a greater or lesser degree of sophistication depending on the application.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A device for measuring rotation of an electric motor rotor shaft of a rotor, the device comprising:
   a commutator including a support ring having a circumference and a plurality of conducting segments arranged over the circumference of the support ring, wherein some of the plurality of conducting segments have an electrically insulating portion and a remainder of the plurality of conducting segments do not have the electrically insulating portion, and the support ring of the commutator is fitted over the electric motor rotor shaft of the rotor; and
   a commutator housing including three brushes to contact the plurality of conducting segments of the commutator, wherein one of the three brushes contacts the electrically insulating portion of the some of the plurality of conducting segments that have the electrically insulating portion.

2. The device according to claim 1, wherein another of the three brushes is an electrical supply brush and the one of the three brushes that contacts the electrically insulating portion is substantially parallel to the electrical supply brush, and wherein the one of the three brushes that contacts the electrically insulating portion and the electrical supply brush are simultaneously in contact with a common conducting segment of the commutator.

3. The device according to claim 1, further including an electrical measurement circuit connected to the one of the three brushes that contacts the electrically insulating portion.

4. The device according to claim 3, wherein the electrical measurement circuit includes a voltage divider bridge, and the electrical measurement circuit measures a voltage at a terminal of the one of the three brushes that contacts the electrically insulating portion.

5. The device according to claim 3, wherein the electrical measurement circuit measures current that passes through the one of the three brushes that contacts the electrically insulating portion.

6. The device according to claim 3, further including a processing circuit for processing electrical measurements delivered by the electrical measurement circuit for the one of the three brushes that contacts the electrically insulating portion, wherein the processing circuit determines at least one of a speed, a direction of rotation, and an angular position of the electric motor rotor shaft from the electrical measurements.

7. The device according to claim 1, wherein the electrically insulating portion is part of each of the some of the plurality of conducting segments.

8. The device according to claim 1, wherein each of the plurality of conducting segments includes a hook member.

9. The device according to claim 1, wherein the electrically insulating portion covers a portion of each of the some of the plurality of conducting segments.

10. The device according to claim 1, wherein each of the some of the plurality of conducting segments includes a first end and an opposing second end, and the electrically insulating portion is located at the first end and a hook member is located at the opposing second end.

11. The device according to claim 1, wherein the other two of the three brushes always contact a conducting portion of the plurality of conducting segments.

12. A method for measuring a rotation of an electric motor rotor shaft of a rotor, the method comprising the steps of:
   providing a device for measuring the rotation of the electric motor rotor shaft including:
      a commutator having a support ring with a circumference and a plurality of conducting segments arranged over the circumference of the support ring, wherein some of the plurality of conducting segments have an electrically insulating portion and a remainder of the plurality of conducting segments do not have the electrically insulating portion, and the support ring of the commutator is fitted over the electric motor rotor shaft of the rotor, and a commutator housing including three brushes that contact the plurality of conducting segments of the commutator, wherein one of the three brushes contacts the electrically insulating portion of the some of the plurality of conducting segments that have the electrically insulating portion;

measuring an electrical value representing a position of the one of the three brushes that contacts the electrically insulating portion of the commutator; and determining at least one of a speed, a direction of rotation and an angular position of the electric motor rotor shaft from the electrical value.

13. The method according to claim 12, wherein the electrically insulating portion is part of each of the some of the plurality of conducting segments.

14. The method according to claim 12, wherein the electrically insulating portion covers a portion of each of the some of the plurality of conducting segments.

* * * * *